United States Patent
Sharon et al.

(10) Patent No.: US 11,416,263 B1
(45) Date of Patent: Aug. 16, 2022

(54) BOOSTED BOOT PROCEDURE BY BACKGROUND RE-ARRANGEMENT OF READ PATTERNS

(71) Applicant: Western Digital Technologies, Inc., San Jose, CA (US)

(72) Inventors: Eran Sharon, Rishon Lezion (IL); Shay Benisty, Beer Sheva (IL); Ariel Navon, Revava (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/175,322

(22) Filed: Feb. 12, 2021

(51) Int. Cl.
*G06F 9/4401* (2018.01)
*G06F 9/30* (2018.01)
*G06F 13/42* (2006.01)

(52) U.S. Cl.
CPC .......... *G06F 9/4406* (2013.01); *G06F 9/3004* (2013.01); *G06F 9/4401* (2013.01); *G06F 9/4411* (2013.01); *G06F 13/4221* (2013.01)

(58) Field of Classification Search
CPC .... G06F 9/4406; G06F 9/3004; G06F 9/4411; G06F 9/4401; G06F 13/4221
See application file for complete search history.

(56) References Cited

U.S. PATENT DOCUMENTS

| | | | |
|---|---|---|---|
| 5,146,578 A | 9/1992 | Zangenehpour | |
| 5,586,294 A | 12/1996 | Goodwin et al. | |
| 5,659,713 A | 8/1997 | Goodwin et al. | |
| 5,761,464 A | 6/1998 | Hopkins | |
| 5,765,213 A | 6/1998 | Ofer | |
| 5,802,566 A | 9/1998 | Hagersten | |
| 5,920,896 A * | 7/1999 | Grimsrud | G06F 3/0632 |
| | | | 711/165 |
| 6,092,149 A | 7/2000 | Hicken et al. | |
| 6,721,870 B1 | 4/2004 | Yochai et al. | |

(Continued)

FOREIGN PATENT DOCUMENTS

| | | | | |
|---|---|---|---|---|
| EP | 0671684 A2 | 9/1995 | | |
| GB | 2399188 A * | 9/2004 | ........... | G06F 9/4401 |

(Continued)

OTHER PUBLICATIONS

International Search Report and Written Opinion issued in related International Patent Application No. PCT/US2019/017823, dated May 20, 2019 (8 pages).

(Continued)

*Primary Examiner* — Glenn A. Auve
(74) *Attorney, Agent, or Firm* — Patterson + Sheridan, LLP; Steven H. VerSteeg (57) ABSTRACT

A data storage device includes a memory device and a controller coupled to the memory device. During a boot operation, the controller is configured to determine whether the boot is a device boot or a host boot. The controller includes a boot optimization unit. The boot optimization unit or the controller is configured to collect statistics of the fetched data, predict the data to be fetched next, and speculatively fetch the data. The controller further includes a rearrangement unit. The controller or the rearrangement unit is configured to rearrange data in the memory device based on the collect statistics of the fetched data so that the next boot operation is more optimized than the current boot operation.

19 Claims, 3 Drawing Sheets

(56) References Cited

U.S. PATENT DOCUMENTS

| | | |
|---|---|---|
| 6,976,147 B1 | 12/2005 | Isaac et al. |
| 7,386,675 B2 | 6/2008 | Fachan |
| 7,451,348 B2 | 11/2008 | Pecone et al. |
| 8,225,047 B2 | 7/2012 | Yano et al. |
| 8,230,208 B2 | 7/2012 | Van De Ven |
| 8,417,880 B2 | 4/2013 | Lam et al. |
| 8,539,163 B1 | 9/2013 | Sivasubramanian et al. |
| 8,732,406 B1 | 5/2014 | Pase et al. |
| 9,110,677 B2 | 8/2015 | Ravimohan et al. |
| 10,642,502 B2 * | 5/2020 | Sharon ................ G06F 12/10 |
| 10,725,781 B1 * | 7/2020 | Avraham ............ G06F 3/0679 |
| 10,732,848 B2 * | 8/2020 | Navon ................ G06F 3/0659 |
| 10,976,964 B2 * | 4/2021 | Ganesh ............... G06F 3/0674 |
| 2003/0018846 A1 | 1/2003 | Fanning |
| 2003/0018849 A1 | 1/2003 | Takaichi |
| 2003/0149837 A1 | 8/2003 | Coker et al. |
| 2006/0047914 A1 | 3/2006 | Hofmann et al. |
| 2007/0016721 A1 | 1/2007 | Gay |
| 2007/0067562 A1 | 3/2007 | Ohsaki et al. |
| 2008/0256295 A1 | 10/2008 | Lambert et al. |
| 2009/0249055 A1 | 10/2009 | Itoh |
| 2011/0126154 A1 | 5/2011 | Boehler et al. |
| 2011/0161646 A1 * | 6/2011 | Yu ........................ G06F 9/4401 713/2 |
| 2011/0182216 A1 | 7/2011 | Ono et al. |
| 2012/0030431 A1 | 2/2012 | Anderson et al. |
| 2012/0159016 A1 | 6/2012 | Morita |
| 2013/0124794 A1 | 5/2013 | Bux et al. |
| 2013/0179460 A1 | 7/2013 | Acuna et al. |
| 2014/0082324 A1 | 3/2014 | Elhamias et al. |
| 2014/0122796 A1 | 5/2014 | DeKoning |
| 2014/0229665 A1 * | 8/2014 | Ebsen ................ G11C 7/1072 711/104 |
| 2014/0281458 A1 * | 9/2014 | Ravimohan ....... G06F 12/0862 713/2 |
| 2014/0325196 A1 * | 10/2014 | Munger ............... G06F 9/4411 713/2 |
| 2014/0359266 A1 * | 12/2014 | Madhusudana ........... G06F 1/24 713/2 |
| 2016/0041829 A1 * | 2/2016 | Singh .................. G06F 9/4401 713/2 |
| 2016/0180094 A1 * | 6/2016 | Dasar .................. G06F 21/575 714/36 |
| 2017/0052794 A1 * | 2/2017 | Berke ................. G06F 9/4406 |
| 2017/0075629 A1 | 3/2017 | Manohar et al. |
| 2017/0109096 A1 | 4/2017 | Jean et al. |
| 2017/0255556 A1 | 9/2017 | Peng et al. |
| 2018/0032349 A1 * | 2/2018 | Bhimanadhuni ......... G06F 8/65 |
| 2018/0052779 A1 | 2/2018 | McCauley et al. |
| 2018/0121209 A1 * | 5/2018 | Sundaram .......... G06F 12/0862 |
| 2018/0314421 A1 | 11/2018 | Linkovsky et al. |
| 2019/0129834 A1 | 5/2019 | Purkayastha et al. |
| 2019/0243659 A1 * | 8/2019 | Lewis ................. G06F 21/572 |
| 2020/0004540 A1 | 1/2020 | Navon et al. |
| 2020/0097188 A1 | 3/2020 | Gunda et al. |
| 2020/0334043 A1 * | 10/2020 | Zlotnick ............ G06F 9/45558 |

FOREIGN PATENT DOCUMENTS

| | | | |
|---|---|---|---|
| WO | 2008016849 A2 | 2/2008 | |
| WO | WO-2019035660 A1 * | 2/2019 | ........... G06F 9/5027 |

OTHER PUBLICATIONS

Adi Fuchs et al., "Loop-Aware Memory Prefetching Using Code Block Working Sets", 47th Annual IEEE/ACM International Symposium on Microarchitecture, 2014 (12 pages).

* cited by examiner

BOOSTED BOOT PROCEDURE BY BACKGROUND RE-ARRANGEMENT OF READ PATTERNS

BACKGROUND OF THE DISCLOSURE

Field of the Disclosure

Embodiments of the present disclosure generally relate to data storage devices, such as solid state drives (SSDs), and booting optimization.

Description of the Related Art

In general, there are two types of shutdowns, graceful and ungraceful. During a graceful shutdown, boot time of a data storage device is usually within a relatively short duration. However, in an ungraceful shutdown due to power reset or power loss, the boot time may be dependent on the state of the internal state machine of the data storage device before losing power and the data storage device capacity.

When a data storage device is booted, the necessary information is retrieved from either an internal memory of the data storage device or retrieved from a location in a host device, such as a host memory buffer (HMB), coupled to the data storage device. The necessary information is loaded in order to be executed so that the data storage device may operate without errors. Because the necessary information may not be stored sequentially or in an efficient manner in the internal memory or in the HMB, the boot time may be prolonged. Boot time is important in data storage device performance as boot time may determine when first host commands received from the host device can be executed.

Therefore, there is a need in the art for an improved boot up method to shorten the boot time.

SUMMARY OF THE DISCLOSURE

The present disclosure generally relates to data storage devices, such as solid state drives (SSDs), and booting optimization. A data storage device includes a memory device and a controller coupled to the memory device. During a boot operation, the controller is configured to determine whether the boot is a device boot or a host boot. The controller includes a boot optimization unit. The boot optimization unit or the controller is configured to collect statistics of the fetched data, predict the data to be fetched next, and speculatively fetch the data. The controller further includes a rearrangement unit. The controller or the rearrangement unit is configured to rearrange data in the memory device based on the collect statistics of the fetched data so that the next boot operation is more optimized than the current boot operation.

In one embodiment, a data storage device includes a memory device and a controller coupled to the memory device. The controller includes a boot optimization unit configured to collect statistics of fetched data for a boot operation, predict data to be fetched based upon the collected statistics, and rearrange data in the memory device based upon the collected statistics.

In another embodiment, a data storage device includes a memory device and a controller coupled to the memory device. The controller includes a central processing unit (CPU), a database, a boot detector, and a manager update/predict module.

In another embodiment, a data storage device includes memory means, means to determine boot data utilized for boot operations, means to determine an order of the boot data utilized for boot operations, means to predict boot data utilized, means to predict boot data utilized order, and means to rearrange data in the memory means based upon the predicted boot data utilized and the predicted boot data utilized order.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and booting optimization. A data storage device includes a memory device and a controller coupled to the memory device. During a boot operation, the controller is configured to determine whether the boot is a device boot or a host boot. The controller includes a boot optimization unit. The boot optimization unit or the controller is configured to collect statistics of the fetched data, predict the data to be fetched next, and speculatively fetch the data. The controller further includes a rearrangement unit. The controller or the rearrangement unit is configured to rearrange data in the memory device based on the collect statistics of the fetched data so that the next boot operation is more optimized than the current boot operation.

Figure 1:
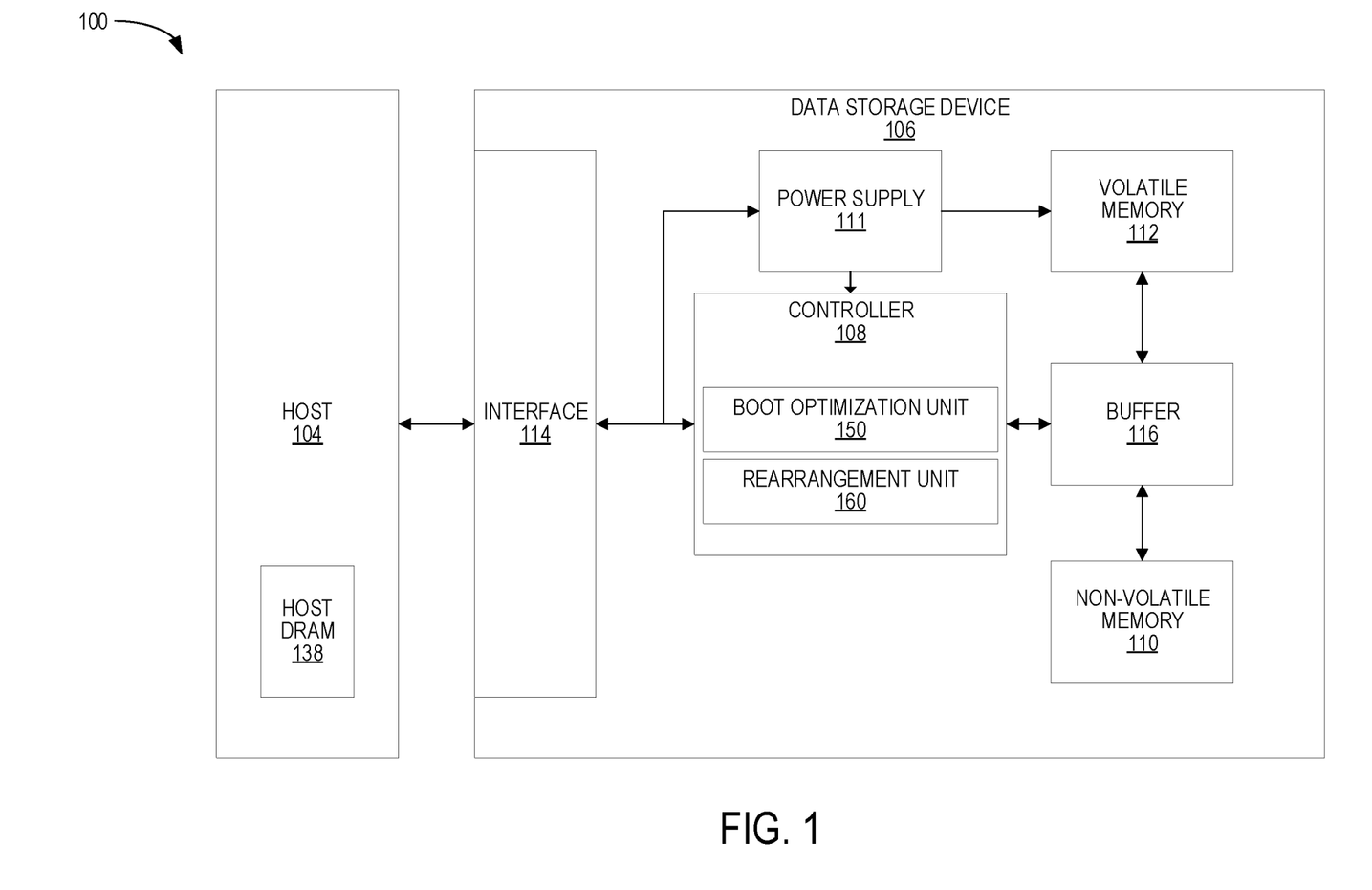
FIG. 1 depicts a schematic block diagram illustrating a storage system in which data storage device may function as a storage device for a host device, according to certain embodiments.

FIG. 1 depicts a schematic block diagram illustrating a storage system 100 in which data storage device 106 may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 includes a boot optimization unit 150 and a rearrangement unit 160. The boot optimization unit 150 may be configured to collect statistics regarding the data being fetched during a boot operation as well as predict where future fetched data may be located in the relevant boot memory. In one non-limiting example, boot memory may either be a location in the NVM 110 or in a host memory buffer (HMB) located in the host DRAM 138. The rearrangement unit 160 may be configured to rearrange the fetched data stored in the relevant boot memory, such that the fetched data is either located on separate memory dies in order to increase parallelism when reading/fetching the data, programmed sequentially to the boot memory, or a mixture of the previously mentioned arrangements.

Figure 2:
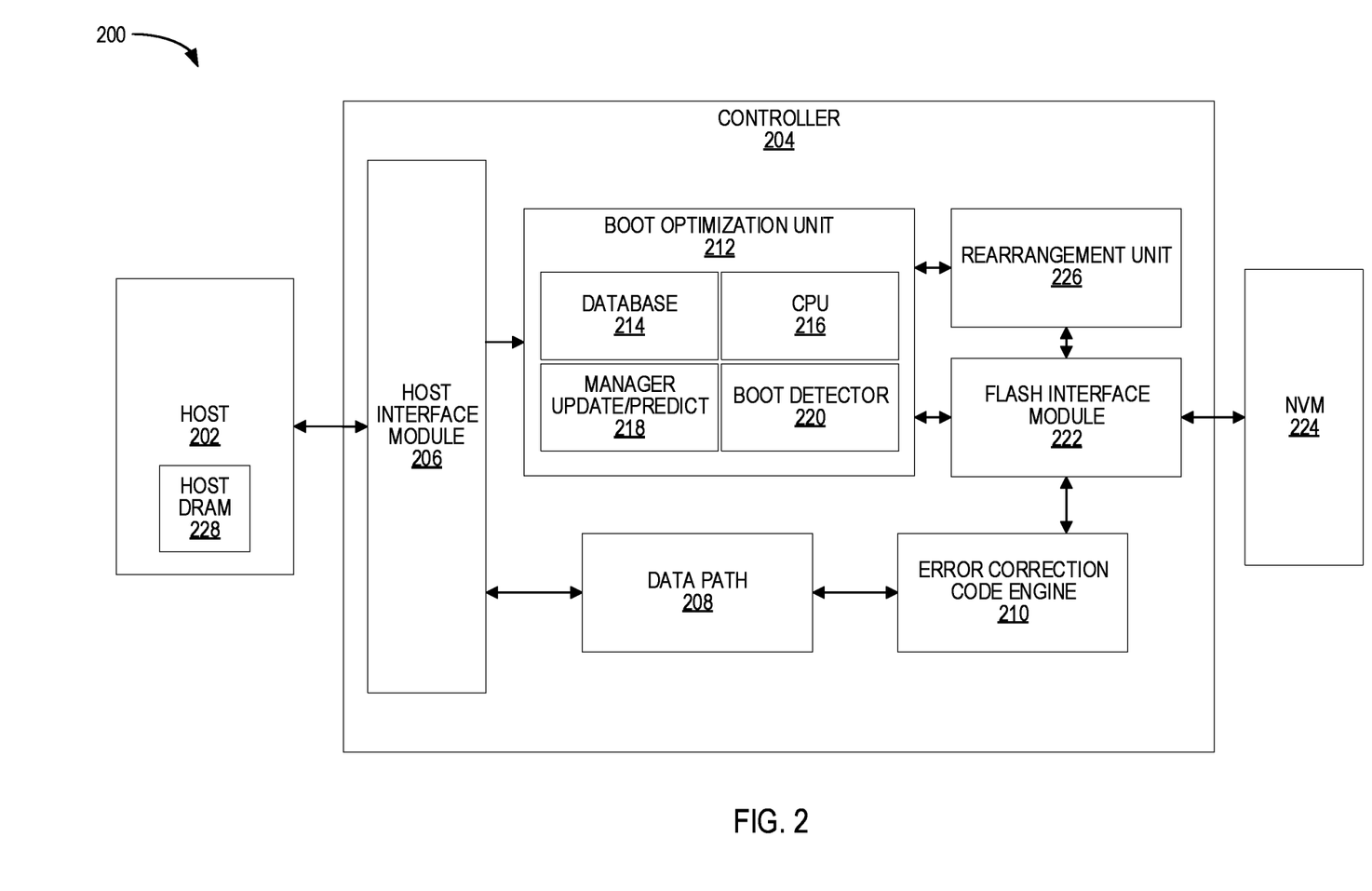
FIG. 2 depicts a schematic block diagram illustrating a storage system in which a controller may interact with a memory device for boot operations, according to certain embodiments.

FIG. 2 depicts a schematic block diagram illustrating a storage system 200 in which a controller 204 may interact with a memory device, such as a host memory buffer (HMB) of a host DRAM 228 of a host 202 or an NVM 224, for boot operations, according to certain embodiments. The controller 204 includes a host interface module (HIM) 206 coupled to the host 202. The HIM 206 may be configured to facilitate the transfer of data between the host 202 and the controller 204.

When data is received at the HIM 206, the data is transferred to a data path 208, where the data path 208 may include direct memory access (DMA) modules, gateways, physical region page (PRP)/scatter gather list (SGL) tables, and the like. Prior to being programmed to the relevant location in the NVM 224, the data is passed through an error correction code (ECC) engine 210, where ECC data is generated for the data to maintain the reliability of the data against errors. Furthermore, the ECC engine 210 may be utilized to decode the ECC data during read operations. The ECC engine 210 is coupled to a flash interface module (FIM) 222.

The controller 204 further includes a boot optimization unit 212 that receives information, such as a signal indicating a boot operation, from the HIM 206. The boot optimization unit 212 may be the boot optimization unit 150 of FIG. 1. The boot optimization unit 212 includes a database 214, a central processing unit (CPU) 216, a manager update/predict module 218, and a boot detector 220. The manager update/predict module 218 may be referred to as a manager 218 for simplicity, herein. The CPU 216 may be responsible for controlling the flow and interaction between the database 214, the manager 218, and the boot detector 220. The boot optimization unit 212 may issue reads to the NVM via the FIM 222 based on predictions by the manager update/predict module 218.

The database 214 is used for storing the boot history of the order of fetching operations from either the NVM 224 or the host DRAM 228 during boot operations. The database 214 may be stored in volatile memory, such as the volatile memory 112 of FIG. 1, or other types of power-fail safe memories. For example, the database 214 may be stored in SRAM, DRAM, and the HMB (in non-limiting cases of a device controller not including DRAM). During an ungraceful shutdown, the data stored in the database 214 may be flushed to the NVM 110 in order to retrieve the relevant data during the next boot. By flushing the data to the NVM 110, the "learning" stage may be eliminated or shortened and the boot fetching data predictions may be available sooner or immediately. In one embodiment, the database 214 includes a host boot database and a device boot database. The host boot database stores the boot history of the order of fetching operations from the host DRAM 228 and the device boot database stores the boot history of the order of fetching operations from the NVM 224.

The boot detector 220 includes logic for detecting the start boot time and the ending boot time of a boot operation. In some embodiments, the boot detector 220 is logic. The fetched data may include an order of the operations and specific operations that occur during the boot operation.

The manager 218 includes logic responsible for managing the database 214. In some embodiments, the manager 218 is logic. The manager 218 updates the boot time utilizing the boot detector 220 and predicts the next data to be retrieved in the boot operation utilizing the database 214. In some embodiments, the manager 218 may speculatively retrieve the next predicted data from the relevant boot location (i.e., the host DRAM 228 or the NVM 224). The boot optimization unit 212 may issue reads to the NVM 224 via the FIM 222 based on predictions by the manager 218.

The controller further includes a rearrangement unit 226 coupled to the FIM 222 and the boot optimization unit 212. The rearrangement unit 226 may be the rearrangement unit 226 of FIG. 1. The rearrangement unit 226 may be configured to rearrange the fetched data stored in the relevant boot memory (i.e., the host DRAM 228 or the NVM 224), such that the fetched data is either located on separate memory dies in order to increase parallelism when reading/fetching the data, programmed sequentially to the boot memory, or a mixture of the previously mentioned arrangements.

The FIM 222 may be responsible for scheduling and programming data to the relevant location of the NVM 224 as well as retrieving the relevant data from the NVM 224. Working in conjunction with the boot optimization unit 212 and the rearrangement unit 226, the FIM 222 may program boot data to the NVM 224 either on separate dies to increase parallelism, sequentially, or both a mixture of sequentially and on separate dies to optimize the data retrieval time during a boot operation. Similarly, the rearrangement unit 226 may work in conjunction with the HIM 206 to program boot data to the host DRAM 228 either on separate dies to increase parallelism, sequentially, or both a mixture of sequentially and on separate dies to optimize the data retrieval time during a boot operation.

Figure 3:
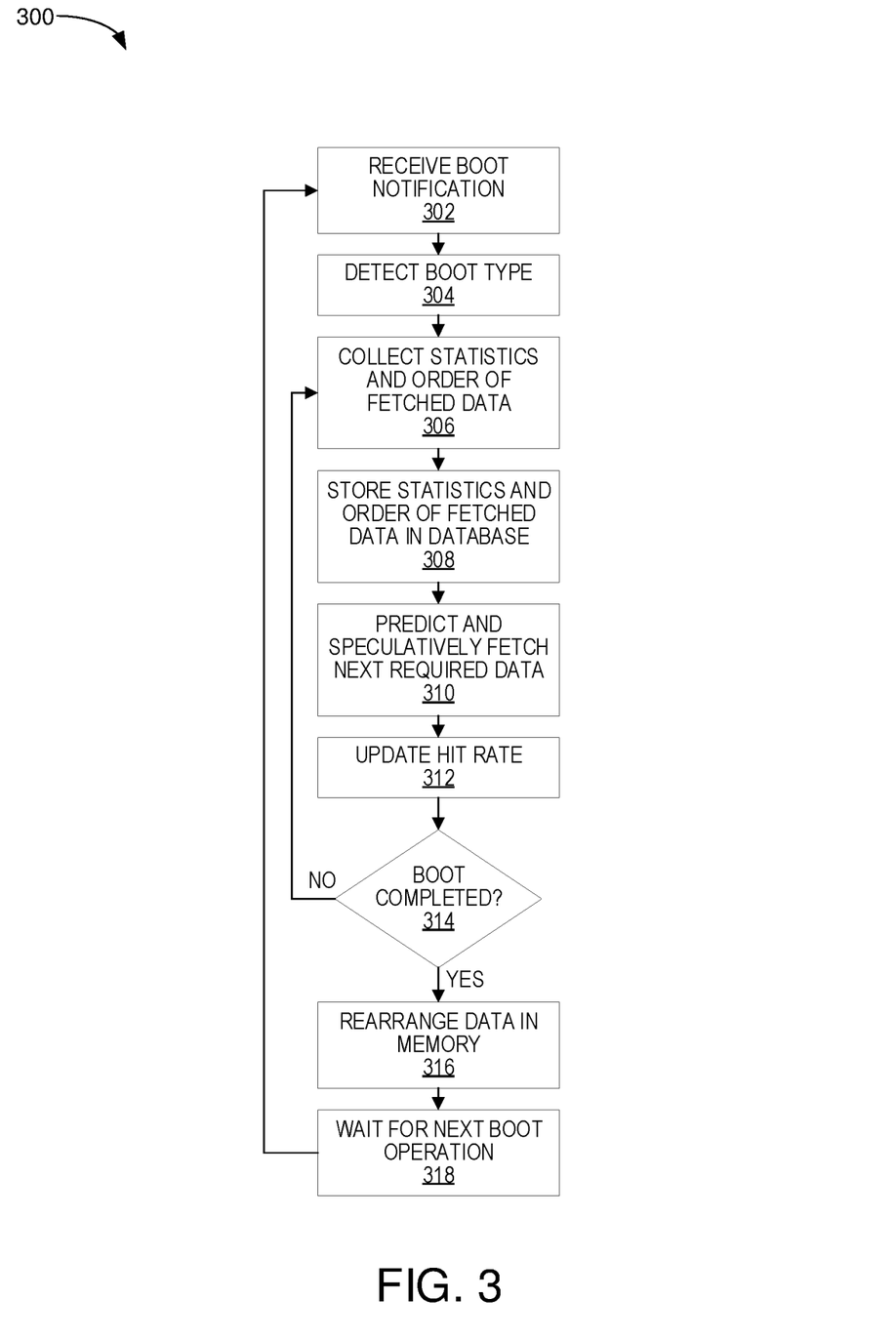
FIG. 3 depicts a flowchart illustrating a method of boot optimization, according to certain embodiments.

FIG. 3 depicts a flowchart illustrating a method 300 of boot optimization of a data storage device, such as the data storage device 106 of FIG. 1, according to certain embodiments. At block 302, a controller, such as the controller 204 of FIG. 2, receives a boot notification. Specifically, a boot detector, such as the boot detector 220 of the boot optimization unit 212 of FIG. 2, determines that a boot operation is initiated.

At block 304, the boot detector 220 determines the boot type. The boot type is either a host boot operation or a device boot operation. The boot detector 220 may determine that the boot is a device boot operation since the boot detector 220 is aware of the boot operation of the data storage device 106. The boot detector 220 may determine that the boot is a host boot operation by an indication that includes at least one of a host, such as the host 202 of FIG. 2, fetching from PCIe eROM memory space, occurring after system reset (e.g., a sequence of host operations that follow the end of a device boot operation for a predefined time of the host boot operation), including specific and unique patterns (e.g., logical block address (LBA) sequences that serve as a signature for host boot operation), and known host specific notifications that may be host 202 specific. The PCIe eROM memory space may be a reserved address space for host boot operation information.

It is to be understood that in some cases, either the host boot operation or the device boot operation may not be available. It is also to be understood that in other cases, the boot operation may be a joint boot, where the joint boot includes the host boot operation and the device boot operation. During a host boot operation, the boot data may be retrieved from the relevant location in an NVM or fetched from a HMB of a host DRAM, such as the host DRAM 228 of FIG. 2. Likewise, during a device boot operation, the boot data is fetched from the relevant location in an NVM, such as the NVM 224 of FIG. 2.

At block 306, a manager update/predict module, such as the manager 218, collects statistics and the order of the fetched data. The statistics and the order of the fetched data may include a size, a location, and the like of the fetched data. Furthermore, the statistics and the order may include an order of the operations and specific operations that occur during the boot operation. At block 308, the manager 218 stores the statistics and the order of the fetched data in a database, such as the database 214 of FIG. 2. Furthermore, the statistics and the order of the fetched data of the host boot operation is stored separately, and in some cases in a separate database, than the statistics and the order of the fetched data of the device boot operation. At block 310, the manager 218 predicts and speculative fetches the next required data from the relevant location, where the relevant location is associated with the location of the stored data of the boot operation (i.e., the host DRAM 228 or the NVM 224).

The update/predict module 218 may log the next LBA that is read as a function of the sequence of previous LBAs that were read. The module may use a HASH mechanism for managing the database. More specifically, the database update may be performed as follows: whenever a new read command is received, a hash may be computed on the set of "n" previously read LBAs (for some predefined value "n"). The hash result may be used for accessing the database and for storing the current LBA in the accessed address. The database update process is performed during a first boot to build the database or during every boot as a continuous learning process. The database update process is improved and fine-tuned each time a boot operation occurs.

In parallel to the database update process ("boot sequence learning"), the database is used for predicting the next LBA and prefetching the next LBA in order to shorten the boot operation time. The prediction may be performed in a similar way to the database update process. For prediction of the next LBA, a hash is computed on the sequence of previously read "n" LBAs. The hash result is used for accessing the database and predicting the next LBA. The prediction may include a prediction accuracy metric. Then, the manager 218 may decide to pre-fetch the next LBA from the NVM 224, before the next LBA is requested by the host 202. The pre-fetching may be a function of the prediction accuracy metric being sufficiently high. For example, if the prediction accuracy metric is above some certain value, such as about 75% then the next LBA is retrieved. However, for low prediction accuracy metrics, the next LBA may be predicted, but not retrieved. It is to be understood that previously listed value is not intended to be limiting, but to provide an example of a possible embodiment. For example, the prediction accuracy metric value threshold may be any number between about 50% to about 100%. Furthermore, the prediction accuracy metric may be updated for each boot operation or for each prediction performed.

At block 312, the manager 218 updates the hit rate of the data corresponding with the fetched data in the database 214. For example, a hit rate may be provided for each command/pattern of data separately, such that the most frequently utilized or fetched commands/patterns may be easily identified. For example, the hit rate may be updated each time a new read command is received from the host 202. The hit rate may be updated by comparing the requested LBA to the predicted LBA (e.g. as obtained from the database using the hash of previous read LBAs). Each time a match is found between requested LBA and predicted LBA then hit rate and/or prediction accuracy metric is increased and vice-versa. At block 314, the boot detector 220 determines if the boot operation has been completed. If the boot operation has not been completed at block 314, then the method 300 returns to block 306, where additional statistics and order of fetched data is further collected. However, if the boot operation has been completed at block 314, then a rearrangement unit, such as the rearrangement unit 226, rearranges and organizes the data in the respective memory location.

The rearranging and organizing occurs as a background operation after the boot operation has completed. The data may be rearranged and organized such that the boot data is predictable and optimally stored for sequential fetching. For example, the data may be stored across several dies in order to increase read parallelism. Likewise, the data may be stored sequentially in a memory location to increase sequential reads. It is important to note that the previous two examples are possible embodiments and are not limiting. Furthermore, the aspects of the previous two examples may be mixed such that the data is stored sequentially across several dies.

At block 318, the boot optimization unit 212 waits for the next boot operation. When the next boot operation is detected, by the boot detector 220, the method 300 begins again at block 302. Each iteration may further optimize the booting operation, such that the boot time may be decreased and first host commands may be executed quicker after the data storage device 106 is booted.

By improving the initialization time for a data storage device through decreasing the boot time, the performance of the data storage device may be increased.

In one embodiment, a data storage device includes a memory device and a controller coupled to the memory device. The controller includes a boot optimization unit configured to collect statistics of fetched data for a boot operation, predict data to be fetched based upon the collected statistics, and rearrange data in the memory device based upon the collected statistics.

The controller is configured to determine whether the boot operation is a boot of the data storage device, a host device, or both. The rearranging data includes rearranging consecutively accessed data across different memory dies of the memory device. The rearranging data further includes rearranging randomly accessed data during a previous boot as sequential accessed data for a next boot. The controller is further configured to fetch data for a boot operation from the different memory dies in parallel. The controller includes a database for storing the collected statistics and boot operation data. The database is distinct from the memory device. The database is updated for each of the collected statistics. The controller is further configured to detect whether the boot operation comprises one or more of the following: fetching data from a PCIe eROM memory space, occurs after a system reset, comprises specific and unique patterns, or known host specific notifications. The collected statistics on fetched data includes an order of the operations and specific operations that occur during the boot operation. The rearranging data occurs after completing the boot operation.

In another embodiment, a data storage device includes a memory device and a controller coupled to the memory device. The controller includes a central processing unit (CPU), a database, a boot detector, and a manager update/predict module.

The controller further includes a rearranging module. The CPU is configured to control a flow and interaction with the database, the boot detector, and the manager update/predict module. The database is configured to store boot history of an order of fetching operations from the memory device during a boot operation. The boot detector is configured to detect a start and an end of boot operations. The manager update/predict module is configured to update the database during boot when data is fetched from the memory device. The manager update/predict module is further configured to predict which data will be needed for a boot operation. The manager update/predict module is logic. The boot detector is logic.

In another embodiment, a data storage device includes memory means, means to determine boot data utilized for boot operations, means to determine an order of the boot data utilized for boot operations, means to predict boot data utilized, means to predict boot data utilized order, and means to rearrange data in the memory means based upon the predicted boot data utilized and the predicted boot data utilized order.

The means to rearrange data in the memory means is configured to rearrange data in separate locations in the memory means such that the predicted boot data utilized can be fetched in parallel. The means to rearrange the data in the memory means is configured to rearrange the data in the memory means after completion of a boot operation.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
    a memory device; and
    a controller coupled to the memory device, wherein the controller comprises a boot optimization unit configured to:
        collect statistics of fetched data for a boot operation;
        predict data to be fetched based upon the collected statistics; and
        rearrange data in the memory device based upon the collected statistics, wherein rearranging the data comprises:
            rearranging the data sequentially based on the predicted data to be fetched; and
            storing the sequentially arranged data on separate memory dies of the memory device.

2. The data storage device of claim 1, wherein rearranging data comprises rearranging consecutively accessed data across different memory dies of the memory device, and wherein rearranging data further comprises rearranging randomly accessed data during a previous boot as sequential accessed data for a next boot.

3. The data storage device of claim 1, wherein the controller is further configured to detect whether the boot operation comprises one or more of the following:
    fetching data from a PCIe eROM memory space;
    occurs after a system reset;
    comprises specific and unique patterns; or
    known host specific notifications.

4. The data storage device of claim 1, wherein the collected statistics on fetched data includes an order of the operations and specific operations that occur during the boot operation.

5. The data storage device of claim 1, wherein the rearranging data occurs after completing the boot operation.

6. A data storage device, comprising:
    a memory device; and
    a controller coupled to the memory device, wherein the controller comprises a boot optimization unit configured to:
        collect statistics of fetched data for a boot operation;
        predict data to be fetched based upon the collected statistics; and
        rearrange data in the memory device based upon the collected statistics; and
    wherein the controller is configured to determine whether the boot operation is a boot of the data storage device, a host device, or both.

7. A data storage device, comprising:
    a memory device; and
    a controller coupled to the memory device, wherein the controller comprises a boot optimization unit configured to:
        collect statistics of fetched data for a boot operation;
        predict data to be fetched based upon the collected statistics; and
        rearrange data in the memory device based upon the collected statistics;
    wherein the controller is further configured to fetch data for a boot operation from the different memory dies in parallel, wherein rearranging data comprises rearranging consecutively accessed data across different memory dies of the memory device, and wherein rearranging data further comprises rearranging randomly accessed data during a previous boot as sequential accessed data for a next boot.

8. A data storage device, comprising:
a memory device; and
a controller coupled to the memory device, wherein the controller comprises a boot optimization unit configured to:
    collect statistics of fetched data for a boot operation;
    predict data to be fetched based upon the collected statistics; and
    rearrange data in the memory device based upon the collected statistics;
wherein the controller comprises a database for storing the collected statistics and boot operation data, wherein the database is distinct from the memory device, and wherein the database is updated for each of the collected statistics.

9. A data storage device, comprising:
a memory device; and
a controller coupled to the memory device, wherein the controller comprises:
    a central processing unit (CPU);
    a database;
    a boot detector;
    a manager update/predict module; and
    a rearranging module, wherein the rearranging module is configured to rearrange boot data sequentially and on separate memory dies of the memory device based on collected statistics of a previous boot operation.

10. The data storage device of claim 9, wherein the CPU is configured to control a flow and interaction with the database, the boot detector, and the manager update/predict module.

11. The data storage device of claim 9, wherein the database is configured to store boot history of an order of fetching operations from the memory device during a boot operation.

12. The data storage device of claim 9, wherein the boot detector is configured to detect a start and an end of boot operations.

13. The data storage device of claim 9, wherein the manager update/predict module is configured to update the database during boot when data is fetched from the memory device.

14. The data storage device of claim 13, wherein the manager update/predict module is further configured to predict which data will be needed for a boot operation.

15. The data storage device of claim 9, wherein the manager update/predict module is logic.

16. The data storage device of claim 9, wherein the boot detector is logic.

17. A data storage device, comprising:
memory means;
means to determine boot data utilized for boot operations;
means to determine an order of the boot data utilized for boot operations;
means to predict boot data utilized;
means to predict boot data utilized order; and
means to rearrange data sequentially and in separate locations in the memory means based upon the predicted boot data utilized and the predicted boot data utilized order.

18. The data storage device of claim 17, wherein the means to rearrange the data in the memory means is configured to rearrange the data in the memory means after completion of a boot operation.

19. A data storage device, comprising:
memory means;
means to determine boot data utilized for boot operations;
means to determine an order of the boot data utilized for boot operations;
means to predict boot data utilized;
means to predict boot data utilized order; and
means to rearrange data in the memory means based upon the predicted boot data utilized and the predicted boot data utilized order, wherein the means to rearrange data in the memory means is configured to rearrange data in separate locations in the memory means such that the predicted boot data utilized can be fetched in parallel.

* * * * *